United States Patent [19]
Takada et al.

[11] Patent Number: 5,349,008
[45] Date of Patent: Sep. 20, 1994

[54] PROCESS FOR SUSPENSION POLYMERIZATION OF VINYL COMPOUND

[75] Inventors: Shigeki Takada; Ken Yuki; Hitoshi Maruyama, all of Kurashiki; Taku Tanaka; Kazunari Igarashi, both of Nakajo, all of Japan

[73] Assignee: Kuraray Co., Ltd., Kurashiki, Japan

[21] Appl. No.: 778,125

[22] PCT Filed: Mar. 29, 1991

[86] PCT No.: PCT/JP91/00420
§ 371 Date: Dec. 4, 1991
§ 102(e) Date: Dec. 4, 1991

[87] PCT Pub. No.: WO91/15518
PCT Pub. Date: Oct. 17, 1991

[30] Foreign Application Priority Data

Apr. 5, 1990 [JP] Japan ................ 2-91514
Apr. 5, 1990 [JP] Japan ................ 2-91515
Oct. 19, 1990 [JP] Japan ................ 2-282690

[51] Int. Cl.$^5$ .................................... C08L 29/04
[52] U.S. Cl. .................................... 524/557; 524/458; 524/459; 524/547; 524/563; 525/56; 525/61; 525/330.3; 525/330.4; 525/330.6; 525/350; 525/330.5; 526/201; 526/202; 526/204; 526/214; 526/220; 526/223; 526/224; 526/319; 526/344; 526/344.2
[58] Field of Search ........... 524/459, 557547, 458, 524/563; 525/56, 61, 330.3, 30.4, 350, 330.5, 330.6; 526/201, 319, 202, 223, 214, 220, 224, 204, 344, 344.2

[56] References Cited
U.S. PATENT DOCUMENTS

| | | | |
|---|---|---|---|
| 3,929,753 | 12/1975 | Itoh et al. | 526/202 |
| 4,208,499 | 6/1980 | Maruhashi et al. | 526/202 |
| 4,226,966 | 10/1980 | Shiraishi et al. | 526/202 |
| 4,258,163 | 3/1981 | Mariasl et al. | 526/202 |
| 4,308,189 | 12/1981 | Moritani et al. | 524/459 |
| 4,324,878 | 4/1982 | Biaggi et al. | 526/200 |
| 4,345,056 | 8/1982 | Thyret et al. | 526/202 |
| 4,388,442 | 6/1983 | Taniguchi et al. | 526/202 X |
| 4,565,854 | 1/1986 | Sato et al. | 526/224 X |
| 4,592,402 | 6/1986 | Shioji et al. | 524/557 X |
| 4,797,458 | 1/1989 | Sharaby | 526/224 X |
| 4,918,151 | 4/1990 | Sharaby | 526/224 X |
| 4,931,518 | 6/1990 | Sharaby | 526/224 X |
| 5,153,284 | 10/1992 | Amano | 526/201 X |

FOREIGN PATENT DOCUMENTS

| | | |
|---|---|---|
| 58-59202 | 4/1983 | Japan . |
| 59-136301 | 8/1984 | Japan . |
| 24823 | 6/1985 | Japan . |
| 101103 | 6/1985 | Japan . |
| 44768 | 9/1988 | Japan . |
| 147483 | 10/1989 | Japan . |

Primary Examiner—Judy M. Reddick
Attorney, Agent, or Firm—Oblon, Spivak, McClelland, Maier & Neustadt

[57] ABSTRACT

Disclosed herein is a process for suspension polymerization of a vinyl polymer which comprises using as the suspending agent a polyvinyl ester polymer having an ionic group at an end thereof or a polyvinyl alcohol polymer having a degree of hydrolysis of 90 mol % or less which is obtained by hydrolysis of the above polyvinyl ester polymer.

According to the above-mentioned process, vinyl polymer granules having a sharp granulometric dispersion, high bulk density, high plasticizer absorption and low vinyl monomer residue are obtained.

9 Claims, 1 Drawing Sheet

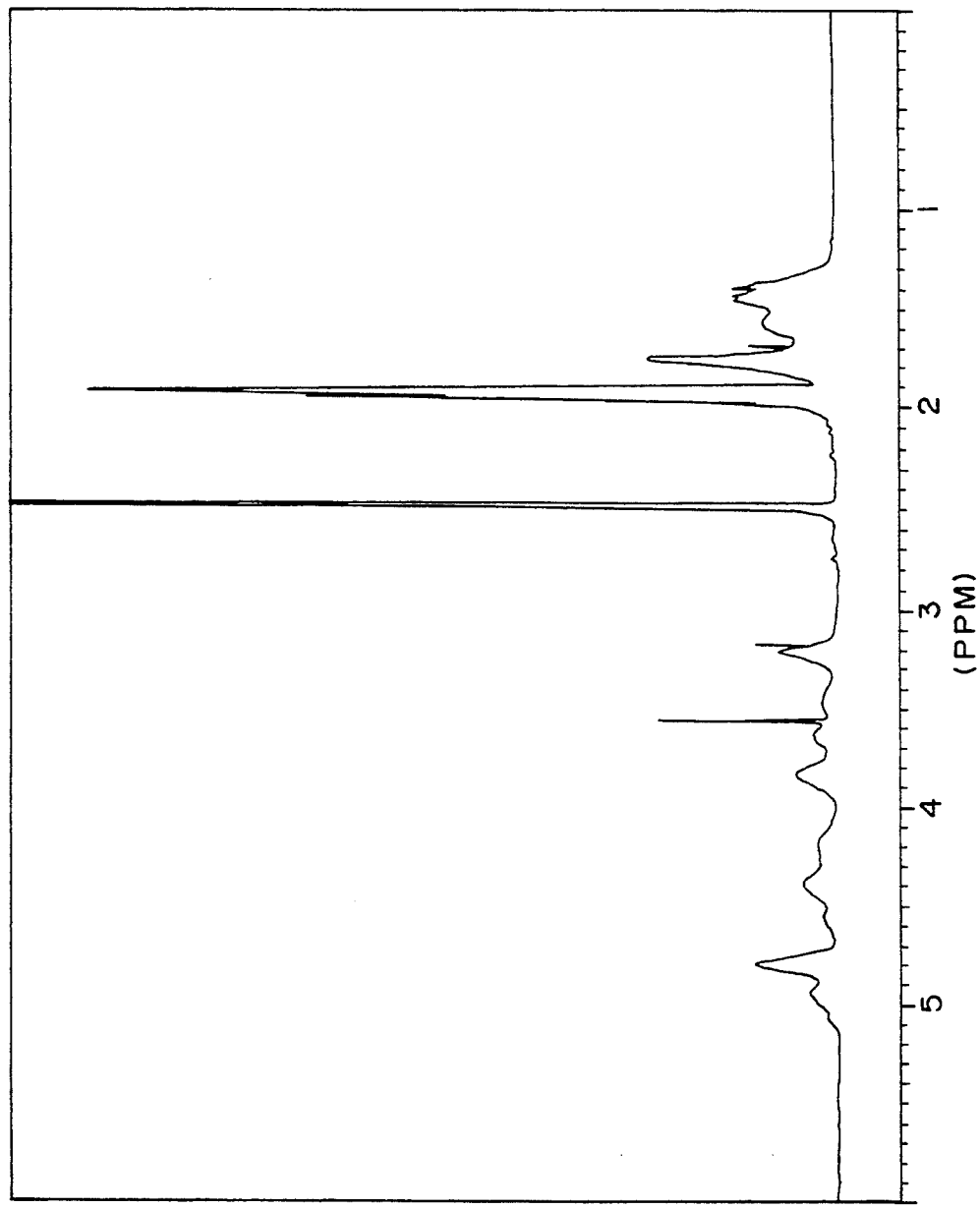

PROCESS FOR SUSPENSION POLYMERIZATION OF VINYL COMPOUND

TECHNICAL FIELD

The present invention relates to a process for suspension polymerization of a vinyl compound. More particularly, it pertains to a process for suspension polymerization of a vinyl compound; a suspending agent for suspension polymerization; and further, an aqueous dispersion useful as a secondary suspending agent for suspension polymerization and polyvinyl alcohol polymer.

Background Art

In industrially producing a vinyl chloride resin, there has heretofore been widely practiced a suspension polymerization process in which vinyl chloride monomer is suspended in an aqueous medium in the presence of a suspending agent and polymerized by the use of an oil-soluble catalyst. In general, the factors governing the quality of a vinyl chloride resin include conversion to polymer, water-monomer ratio, polymerization temperature, kind and amount of catalyst, type of polymerization vessel, agitation rate, kind and amount of suspending agent and the like. It is known that among them the kind of suspending agent has the most effect.

The performance required for a suspending agent for suspension polymerization of a vinyl chloride monomer include (i) the agent functions so as to exhibit a high suspending power and to make the granulometric distribution of the vinyl chloride polymer granules obtained as sharp as possible by the use of a small amount of the agent; (ii) the agent functions so as to make polymer granules obtained as uniform and porous as possible to increase the absorption rate of a plasticizer for facilitating the workability, to facilitate the removal of vinyl chloride monomer residue in polymer granules and to prevent the formation of fish eye, etc. in the molding; (iii) the agent functions so as to produce polymer granules having a high bulk density, and the like.

As a suspending agent for suspension polymerization of a vinyl compound, there has heretofore been used a cellulose derivative such as methylcellulose, carboxymethylcellulose, etc., partially hydrolyzed polyvinyl alcohol (hereinafter abbreviated as "PVA"), PVA having an ionic group at a side chain thereof or the like, alone or in combination.

However, vinyl chloride resin granules obtained by suspension polymerization of vinyl chloride by the use of a PVA or polyvinyl ester (hereinafter abbreviated as "PVES") each having an ionic group at a side chain thereof as a primary suspending agent or a secondary primary agent have favorable processing characteristics, but involve such problems as unstable suspension polymerization and the increase of scale adhered to a polymerization vessel. (Refer to Japanese Patent Application Laid-Open Nos. 137105/1980, 112985/1979 and 95103/1989)

In addition, an aqueous dispersion obtained by post-emulsification of PVA having a degree of hydrolysis of 20 to 60 mol % is very poor in stability after being allowed to stand, and is incapable of producing vinyl chloride resin granules having a satisfactory porosity and bulk density. (Refer to Japanese Patent Application Laid-Open No. 167745/1981).

Moreover, the suspension polymerization of vinyl chloride by the use of a vinyl polymer emulsion as a secondary suspending agent necessitates the preliminary agitation period of time prior to suspension polymerization by 3 to 5 times as long as an ordinary agitation period of time for the sake of attaining the effect, thus causing a serious disadvantage in workability. (Refer to Japanese Patent Application Laid-Open No. 64(1989)-51409).

DISCLOSURE OF INVENTION

It is an object of the present invention to provide a process for suspension polymerization of a vinyl compound having favorable polymerization stability and capable of producing vinyl polymer particles with satisfactory processing characteristics.

It is another object of the present invention to provide suspending agents such as a primary suspending agent, secondary suspending agent and the like for suspension polymerization of vinyl compound to be used in the abovementioned process for suspension polymerization of a vinyl compound.

It is still another object of the present invention to provide an aqueous dispersion useful as the above-mentioned secondary suspending agent for suspension polymerization of a vinyl compound.

It is a further object of the present invention to provide a PVA polymer useful as a dispersoid for the abovementioned aqueous dispersion.

As a result of intensive research and investigation on a process for suspension polymerization of a vinyl compound made by the present inventors in the light of the present situation as mentioned above, it has been found that the suspension polymerization of a vinyl compound can be efficiently performed by using as the suspending agent a PVES polymer having an ionic group at an end thereof or a PVA polymer having a degree of hydrolysis of 90 mol % or less which is obtained by hydrolyzing said PVES polymer. The present invention has been accomplished on the basis of the aforementioned finding and information.

In more detail, the present invention provides a process for suspension polymerization of a vinyl compound which comprises using as the suspending agent a PVES polymer having an ionic group at an end thereof or a PVA polymer having a degree of hydrolysis of 90 mol % or less which is obtained by hydrolyzing said PVES polymer.

In addition, the present invention provides a suspending agent for suspension polymerization of a vinyl compound, which agent comprising the above-mentioned PVES polymer or PVA polymer. Moreover, the present invention provides a secondary suspending agent for suspension polymerization of a vinyl compound, which agent comprising the above-mentioned PVES polymer or a PVA polymer having a degree of hydrolysis of 60 mol % or less which is obtained by hydrolyzing said PVES polymer, and furthermore, an aqueous dispersion which comprises dispersing in water said PVES polymer or aforesaid PVA polymer having a degree of hydrolysis of 60 mol % or less. Still furthermore, the present invention provides a PVA polymer having a carboxyl group at an end thereof, a degree of hydrolysis of 10 to 60 mol % and a degree of polymerization of 50 to 3,000.

BRIEF DESCRIPTION OF THE DRAWING

FIG. 1 shows a NMR spectrum of the PVES polymer obtained in Synthesis Example 2.

BEST MODE FOR CARRYING OUT THE INVENTION

The suspending agent to be employed in the process for suspension polymerization of a vinyl compound according to the present invention comprises, as described above, a PVES polymer having an ionic group at an end thereof or a PVA polymer having an ionic group at an end thereof and a degree of hydrolysis of 90 mol % or less, which PVA polymer being obtained by hydrolyzing said PVES polymer.

The suspending agent to be employed in the suspension polymerization of a vinyl compound includes a primary suspending agent and a secondary suspending agent. By the term "primary suspending agent" as used herein means a suspending agent capable of promoting stable suspension polymerization even when used alone as a suspending agent. On the other hand, by the term "secondary suspending agent" as used herein means a suspending agent incapable of promoting stable suspension polymerization when used alone but having a function of markedly improving the processing characteristics of vinyl resin granules obtained according to the present invention when used in combination with a primary suspending agent. By the term "suspending agent" as used in the present Description means both primary suspending agent and secondary suspending agent, comprehensively.

At the beginning, a secondary suspending agent to be used in suspension polymerization of vinyl compound according to the present invention will be described.

The secondary suspending agent of the present invention comprises a PVES polymer having an ionic group at an end thereof or a PVA polymer having a degree of hydrolysis of 60 mol % or less which is obtained by hydrolyzing said PVES polymer. Both the aforesaid PVES polymer and PVA polymer are effective as a secondary suspending agent, but particularly the PVA polymer is suitably used.

The degree of hydrolysis of the PVA polymer may be 60 mol % or less, desirably 10 to 60 mol %, more desirably 20 to 50 mol %.

The degree of polymerization of the PVES polymer or the PVA polymer is not specifically limited, but desirably 50 to 3,000, more desirably 100 to 2,000.

As a vinyl ester unit consisting the above-mentioned PVES polymer or the PVA polymer, the units derived from a variety of vinyl ester compounds are available and exemplified by the unit derived from vinyl acetate, vinyl formate, vinyl propionate, vinyl butyrate, vinyl isobutyrate, vinyl pivalate, vinyl caprylate, vinyl versate or the like. Among them, vinyl acetate unit is preferable from the industrial point of view.

The degree of polymerization of the above-mentioned PVES polymer or PVA polymer is calculated by the method in which said PVES or PVA polymer is substantially subjected to complete hydrolysis followed by acetylation into polyvinyl acetate, the solution of the polyvinyl acetate in acetone is measured for intrinsic viscosity, and the degree of polymerization is calculated from the intrinsic viscosity thus measured by the use of NakaJima's formula (Akio Nakajima Kobunshi Kagaku (Polymer Chemisty), 6, 451(1949)). The ratio of weight-average degree of polymerization (Pw) to number-average degree of polymarization (Pn): Pw/Pn can be obtained, for example, in case the polymer is composed of the vinyl ester unit derived from vinyl acetate, by measuring the polyvinyl acetate polymer obtained by reacetylation of aforesaid polymer by means of gel permeation chromatography (GPC). Degree of hydrolysis means that of the vinyl ester component excluding any other component copolymerized with said vinyl ester component. In addition, degree of hydrolysis can be obtained by the known and conventional chemical analysis method and nuclear magnetic resonance analysis method.

The methods of measuring the degree of polymerization and degree of hydrolysis for the above-mentioned PVES polymer or PVA polymer are applied to the following aspects of the present invention described in the present Description.

The ionic group which the PVES or PVA polymer according to the present invention is to possess at one or both ends (preferably at one end) is not specifically limited, but preferably amino group, ammonium group, carboxyl group or sulfonic group. Examples of amino group or ammonium group include the group derived from thiol represented by the following general formulae (a) to (d):

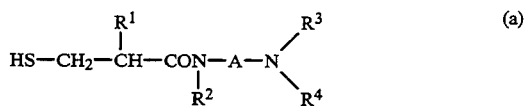

and quaternary product thereof

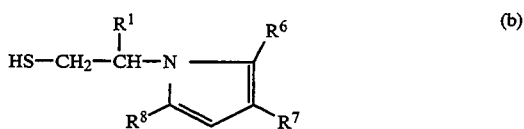

and quaternary product thereof

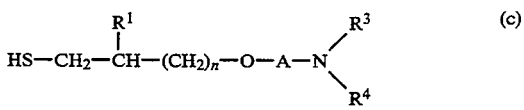

and quaternary product thereof

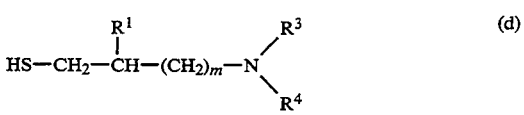

and quaternary product thereof wherein n is an integer of 0 to 3; m is an integer of 1 to 10, $R^1$, $R^2$, $R^6$, $R^7$ and $R^8$ are each hydrogen atom or methyl group; $R^3$ and $R^4$ are each lower alkyl group which may contain a substituent; and A is a group linking nitrogen atom in amine or ammonium to the nitrogen atom of the amide in formula (a) or the oxygen atom in formula (c).

Examples of carboxyl group include the group derived from thiol represented by the following general formulae (e) and (f):

and salt thereof

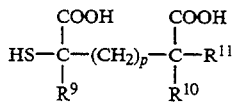

(f)

and salt thereof wherein p is an integer of 0 to 5; and $R^9$, $R^{10}$ and $R^{11}$ are each hydrogen atom or lower alkyl group which may contain a substituent.

Examples of sulfonic group include the group derived from thiol represented by the following general formulae (g) to (j):

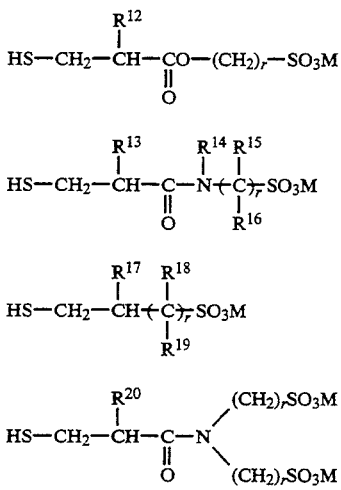

wherein r is an integer of 1 to 4; $R^{12}$ to $R^{20}$ are each hydrogen atom or methyl group; M is hydrogen atom, alkali metal or ammonium ion; and when r is 2 or more, $R^{15}$, $R^{16}$, $R^{18}$ and $R^{19}$, the number of each being the same as r may be the same or different from others.

The ionic group at an end of a PVES polymer or PVA polymer according to the present invention is desirably amino group, ammonium group, carboxyl group or sulfonic group as exemplified above, more desirably carboxyl group. The above ionic group includes a salt thereof, which is preferably an alkali metal salt from the viewpoint of dispersibility and solubility in water of said PVES polymer or PVA polymer.

The process for producing the aforementioned PVES polymer or PVA polymer having an ionic group at an end thereof is not specifically limited. There are available a variety of processes, for example, (i) a process in which a vinyl ester is polymerized in the presence of an alcohol having an ionic group, an aldehyde or a compound having a functional group such as thiol as a chain-transfer agent, followed by hydrolysis to give a PVES polymer or PVA polymer having an ionic group at an end thereof and (ii) a process in which an ionic group is introduced to the end of a PVES or PVA polymer by means of chemical reaction, and the like. However, the preferable process for producing an excellent secondary suspending agent for suspension polymerization by introducing an ionic group to an end of a polymer more economically and efficiently is a process in which a vinyl ester such as vinyl acetate, etc. is polymerized in the presence of a chain-transfer agent having an ionic group, especially a thiol having a functional group, followed by hydrolysis. (Refer to Japanese Patent Application Laid-Open Nos. 28121/1982 and 105410/1982).

In polymerizing a vinyl ester such as vinyl acetate, etc. in the presence of a thiol having an ionic group, the amount of the thiol to be added to the polymerization system and the method of adding may be suitably selected and determined taking into consideration the performance of the secondary suspending agent required for PVES polymer or PVA polymer, since the aforesaid amount of the thiol to be added and the method of adding exert an influence on the degree of polymerization and distribution of degree of polymerization of the polymer obtained. In order to efficiently introduce an ionic group to one or both ends, especially to one end of a PVES polymer or PVA polymer to obtain an excellent secondary suspending agent, however, it is preferable to minimize the change in the amount of the thiol in the reaction system relative to the amount of vinyl ester by adding the thiol corresponding to the conversion of vinyl ester to polymer in the polymerization system. By the abovementioned method, the introduction efficiency of an ionic group to an end is improved, the distribution of degree of polymerization is narrowly limited, and a secondary suspending agent excellent in performance is favorably obtained. In particular, the ratio of weight-average molecular weight (Pw) to number-average molecular weight (Pn): Pw/Pn which indicates the distribution of degree of polymerization, is desirably 4.0 or less.

The above-mentioned PVES polymer or PVA polymer indispensably having an ionic group at an end thereof may have an ionic group at a side chain thereof which ionic group is the same as or different from the end group insofar as the effect of a secondary suspending agent is not impaired. It is also possible to introduce a nonionic group to a side chain.

As the polymerization methods of a polyvinyl ester which is the starting material of a PVES polymer or PVA polymer according to the present invention, the previously known methods such as bulk polymerization, solution polymerization, suspension polymerization or emulsion polymerization may be adopted, but from the industrial standpoint the solution polymerization using methanol or toluene is most desirable. As for polymerization operation, any process among batch process, semi-batch process and continuous process may be applied to the production of said polymer.

As the initiator to be used in the polymerization for the purpose of obtaining a secondary suspending agent according to the present invention, a known radical polymerization initiator is usually used, and exemplified by 2,2'-azobisisobutyronitrile, 2,2'-azobis(4-methoxy-2,4-dimethylvaleronitrile); benzoyl peroxide; di-isopropyl peroxydicarbonate; potassium persulfate, etc. The polymerization temperature may be suitably set according to the initiator to be used, but preferably at 10° to 90° C.

As the process for producing a PVA polymer having an ionic group at an end thereof, a known process, that is, the process in which a PVES polymer having an ionic group at an end thereof is hydrolyzed is usually exemplified. As the method of hydrolysis, any of alkali hydrolysis and acid hydrolysis may be adopted, but from the industrial viewpoint, the most advantageous is methanolysis in methanol of solvent using NaOH or $CH_3ONa$ as a catalyst. The hydrolysis temperature is not specifically limited but preferably 20° to 60° C. in the light of preventing the PVA polymer from being colored. The preferable amount of NaOH or $CH_3ONa$ to be used as a catalyst is usually 0.2 mol or less per 1 mol of vinyl ester unit from the standpoint of preventing the PVA polymer from being colored and minimizing the amount of sodium acetate. In case the functional group introduced to an end contains a substance such as an acid which consumes alkali, it is desirable in carrying out the hydrolysis that more amount of alkali than the above range be added to compensate the consumption thereof.

The secondary suspending agent according to the present invention can be used in a variety of ways, that are exemplified by a method wherein a secondary suspending agent in the form of powder as such is fed to a polymerization vessel (Method I); a method wherein a solution of a secondary suspending agent in an organic solvent such as methanol, etc. is fed to a polymerization vessel (Method II); a method wherein an aqueous dispersion of a secondary suspending agent is mixed with an aqueous solution of a primary suspending agent to be used in combination, and the resultant liquid mixture is fed to a polymerization vessel (Method III); a method wherein each of an aqueous dispersion of a secondary suspending agent and an aqueous solution of a primary suspending agent to be used in combination is separately fed to a polymerization vessel (Method IV) and the like method. Among the aforesaid methods, Method I is unsuited to industrial application in the majority of cases, Method II is likely to cause an environmental pollution problem due to contamination with the organic solvent, whereas Methods III and IV are preferable from both industrial and environmental pollution preventive points of view. Between the above two, Method IV is most suitable in the light of processing characteristics etc. of the vinyl resin obtained.

A PVES polymer or PVA polymer which constitutes a secondary suspending agent (A) of the present invention is used in combination with a primary suspending agent (B) such as PVA or the like. In the case of the combined use of (A) and (B), the content of (A) is not specifically limited, but desirably 10 to 70% by weight, more desirably 10 to 50% by weight.

In case the ratio by weight of (A) to (B): (A)/(B) is less than 10/90, the effect obtained by addition of (A) is low, whereas in case (A)/(B) is more than 70/30, it sometimes exerts an adverse influence on the polymerization stability.

A primary suspending agent (B) of the present invention to be used in combination with a secondary suspending agent (A) is not specifically limited insofar as it is usable as a suspending agent for suspension polymerization of a vinyl compound, but is most desirably a PVA or PVA polymer having a degree of polymerization of 300 to 3000 and a degree of hydrolysis of 60 to 90 mol %, and optionally having an ionic or nonionic group at an end thereof.

A PVA or PVA polymer having a degree of hydrolysis of less than 60 mol % may be used in combination with the aforementioned suspending agent comprising a secondary suspending agent (A) and a primary suspending agent (B).

In addition, a known cellulose derivative can be used as a primary suspending agent (B).

In the following, a primary suspending agent for suspension polymerization of a vinyl compound according to the prevent invention will be described.

A primary suspending agent according to the present invention comprises a PVA polymer having an ionic group at an end thereof and having a degree of hydrolysis of more than 60 mol % and 90 mol % or less, preferably 65 to 85 mol % and a degree of polymerization of desirably 100 or more, more desirably 300 to 3,000.

The ionic group existing at one or both ends, preferably at one end of a PVA polymer constituting a primary suspending agent for suspension polymerization of a vinyl compound according to the present invention is exemplified by the same ionic groups as those in the explanation of the secondary suspending agent.

Moreover, the process for producing a PVA polymer as the aforementioned primary suspending agent is the same as the process described in the process for producing a secondary suspending agent.

A PVA polymer of the present invention having an ionic group at an end thereof exhibits an excellent suspension stability in suspension polymerization of a vinyl compound even when used alone. However, it is more effective to use the above PVA polymer in combination with one or two among PVA (C); PVA polymer (C) (PVA polymer means a modified PVA other than PVA polymer having an ionic group at an end thereof) each having a degree of hydrolysis of 60 to 90 mol % and a degree of polymerization of 100 to 3500; PVA (D); PVA polymer (D) (PVA polymer means a modified PVA other than PVA polymer having an ionic group at an end thereof) each having a degree of hydrolysis of 20 to 60 mol % and a degree of polymerization of 100 to 3500. Hereinafter, PVA (C), PVA polymer (C), PVA (D) or PVA polymer (D) is sometimes referred to as "PVA polymer used in combination". The amount of a jointly used PVA polymer to be used may be optionally selected so long as it is within the range not impairing the effect of a primary suspending agent of the present invention, and is preferably not more than the amount of the primary suspending agent. But in some case it is preferably to use the PVA polymer used in combination in an amount of not less than that of the primary suspending agent. The preferably ratio by weight, that is, (weight of PVA polymer having an ionic group at an end thereof)/(weight of PVA polymer used in combination) is 50/50 to 95/5. For example, the combined use with a PVA polymer having a relatively high degree of polymerization of 500 or more, especially 1000 or more in equal or less amount can improve polymerization stability and produce a vinyl polymer such as polyvinyl chloride excellent in porosity, thus leading to a favorable result. In this case, a PVA polymer having a relatively high degree of hydrolysis may be used.

The degree of polymerization of a PVA polymer having an ionic group at an end thereof as a primary suspending agent of the present invention is not specifically restricted but is usually 100 or more, preferably 300 or more. However, in the combined use with the aforestated PVA polymer used in combination, the degree of polymerization of about 100 to about 150 can bring about a favorable result. The ratio by weight; (PVA polymer having an ionic group at an end thereof)/(PVA polymer used in combination) is preferably 50/50 to 20/80.

In what follows, a process for suspension polymerization of a vinyl compound will be explained.

In the process for suspension polymerization of a vinyl compound according to the present invention, a vinyl compound alone or a mixture of a vinyl compound as the major component and a monomer copolymerizable with said vinyl compound is subjected to suspension polymerization by the use of abovementioned secondary suspending agent or primary suspending agent, which means a secondary suspending agent or a primary suspending agent comprising a PVES polymer or PVA polymer having an ionic group at an end thereof. In case a PVES polymer or PVA polymer having an ionic group at an end thereof is used as the secondary suspending agent, the primary suspending agent is preferably an unmodified PVA. The process for suspension polymerization according to the present invention is applicable to a variety of vinyl compounds, and in particular, suitably applicable to vinyl chloride. The suspension polymerization of a vinyl compound is usually carried out by adding a suspending agent in an amount of 0.005 to 0.3%, preferably 0.01 to 0.2% by solid weight based on the vinyl compound to suspend the vinyl compound or a mixture of said vinyl compound and a monomer copolymerizable with said vinyl compound in aqueous medium with the presence of an oil-soluble catalyst. The aforestated primary suspending agent may be added in the form of powder as such or as an aqueous solution to the aqueous medium in the suspension polymerization system.

A secondary suspending agent may be added to the aqueous medium in the suspension polymerization system as powder as such, or as solution in methanol or as an aqueous dispersion, the last being preferable.

The catalyst to be used in the suspension polymerization of a vinyl compound may be any one provided that it is oil-soluble, and is exemplified by benzoyl peroxide; lauroyl peroxide; di-isopropyl peroxydicarbonate; 2,2'-azoisobutyronitrile; 2,2'-azobis-2,4-dimethyl valeronitrile or mixture thereof.

The polymerization temperature differs from one another depending upon a variety of conditions, but in general, is suitably selected in the range of 30° to 70° C., approximately.

Examples of monomers copolymerizable with a vinyl compound such as vinyl chloride include a variety of monomers such as halogenated vinylidene, vinyl ether, vinyl acetate, acrylic acid, methacrylic acid, and esters thereof, maleic acid and anhydride thereof, itaconic acid, styrene, etc.

The suspending stabilizing agent of the present invention as described hereinbefore mainly with respect to the polymerization of vinyl chloride is not necessarily limited thereto, but is applicable to the suspension polymerization of various vinyl compounds including styrene, methacrylate and the like.

Next, the aqueous dispersion of the present invention capable of being suitably used as a secondary suspending agent for suspension polymerization of a vinyl compound will hereinafter be described. The aqueous dispersion of the present invention is that composed of a PVES polymer or a PVA polymer each having an ionic group at an end thereof as the dispersoid as mentioned in the description of the secondary suspending agent for suspension polymerization of a vinyl compound.

The aqueous dispersion of the present invention is preferably the one in which a PVES polymer or a PVA polymer as a dispersoid has self emulsifiable property. When the dispersoid is a PVA polymer, the degree of hydrolysis of the polymer is 60 mol % or less, desirably 10 to 60 mol %, more desirably 20 to 50 mol %.

The degree of polymerization of the PVES polymer or PVA polymer is desirably 2,000 or less. The degree of polymerization thereof is desirably less than 200 in case the degree of hydrolysis thereof is less than 20 mol %. The concentration of the aqueous dispersion is not specifically limited, but desirably 70% by weight or less, more desirably 1 to 6% by weight. When a high concentration is permissible, an aqueous dispersion of 30 to 60% by weight in concentration can be used without any difficulty.

The particle diameter of the dispersoid is not specifically restricted, but desirably 10 μm or less, more desirably 0.01 to 1 μm, furthermore desirably 0.01 to 0.1 μm, and from the viewpoint of stability of the aqueous dispersion during a long-term storage, a smaller particle diameter is preferable.

The most desirable embodiment of an aqueous dispersion of the present invention is realized in a PVES polymer or PVA polymer per se having a self emulsifiable property. The aqueous dispersion endowed with such a property can provide a long-term storage stability for one month or longer without the use of another suspending agent or an emulsifier.

Various additives may be optionally added to the aqueous dispersion of the present invention comprising a PVES polymer or a PVA polymer as the dispersoid, so long as the amount of additives is within the range not exerting adverse influences on the stability or use of the aqueous dispersion. It is effective to add, for example, a known additive such as a PVA polymer, cellulose-based derivative, anionic, cationic or nonionic surfactant or the like to the PVES polymer or PVA polymer in an amount of 5% by weight or less, preferably 1% by weight or less, based on said PVES polymer or PVA polymer. It is also effective to add an alkali or salt thereof such as NaOH, $Na_2CO_3$, $NaHCO_3$, $CH_3COONa$, or the like in an amount of 1% by weight or less, based on the PVES polymer or PVA polymer of the present invention.

The process for producing an aqueous dispersion of the present invention comprising a PVES polymer or PVA polymer as the dispersoid is not specifically limited, and is exemplified by a process wherein a PVES polymer or PVA polymer each in the form of powder is placed in water with stirring followed by successive stirring, the same process as above except that the stirring is effected under heating, and the like. Since a concentrated aqueous dispersion causes the increase in viscosity thereof, it is possible to obtain the required aqueous dispersion by means of a kneading machine such as a kneader.

The aqueous dispersion of the present invention can be widely used in the field where the conventional PVES polymer or PVA polymer has been employed such as adhesive, paper coating agent, fiber sizing, etc. in addition to the use as a secondary suspending agent for suspension polymerization of a vinyl compound.

In the following, the PVA polymer of the present invention which is useful as a secondary suspending agent for suspension polymerization of a vinyl compound and is useful as an aqueous dispersion will be described.

The PVA polymer of the present invention is that having a carboxyl group at an end thereof, a degree of hydrolysis of 10 to 60 mol % and a degree of polymerization of 50 to 3,000.

The carboxyl group which a PVA polymer of the present invention has at one or both ends thereof, preferably at one end thereof is exemplified by the carboxyl groups mentioned in the explanation of the above-mentioned secondary suspending agent for a vinyl compound. The degree of hydrolysis of the PVA polymer is 10 to 60 mol %, more desirably 20 to 55 mol %, most desirably 30 to 50 mol %. The degree of polymerization thereof is 50 to 3,000, more desirably 100 to 2,000, most desirably 100 to 1,000.

When the PVA polymer has a degree of hydrolysis and a degree of polymerization each within the above-specified range, it can exhibit markedly excellent function and result as a secondary suspending agent for suspension polymerization of a vinyl compound and aqueous dispersion, etc.

The vinyl ester unit constituting the PVA polymer is exemplified by the vinyl ester units as exemplified in the above explanation of the secondary suspending agent for vinyl compound.

As the process for producing the PVA polymer of the present invention, mention may be made of the processes exemplified in the above explanation of the secondary suspending agent for vinyl compound.

In what follows, explanations will be given of both PVES polymer having sulfonic group, amino group or ammonium group at an end thereof; and PVA polymer having sulfonic group, amino group or ammonium group at an end thereof, which polymers being useful as a secondary suspending agent for suspension polymerization of a vinyl compound and aqueous dispersion.

The degree of polymerization for each of the PVES polymer and PVA polymer is 50 to 3,000, and the degree of hydrolysis of the PVA polymer is 60 mol % or less.

As to sulfonic group, amino group or ammonium group which each of the PVES polymer and PVA polymer has at one or both ends, preferably at one end thereof, mention may be made of the sulfonic group, amino group or ammonium group exemplified in the above explanation of the secondary suspending agent for vinyl compound. The degree of hydrolysis of the PVA polymer is 60 mol % or less, desirably 10 to 60 mol %, more desirably 20 to 50 mol %. The degree of polymerization for each of the PVES polymer and PVA polymer is 50 to 3,000, more desirably 100 to 2,000, most desirably 100 to 1,000.

In case the PVES polymer or PVA polymer has a degree of hydrolysis and a degree of polymerization each within the above-specified range, it can exhibit remarkably surpassing function and result as a secondary suspending agent for suspension polymerization of a vinyl compound, and aqueous dispersion, etc.

As to the vinyl ester unit constituting the PVES polymer or PVA polymer, mention may be made of the vinyl ester units enumerated in the explanation hereinbefore of the secondary suspending agent for a vinyl compound.

With regard to the processes for producing the PVES polymer and PVA polymer, mention may be made of the processes enumerated in the explanation hereinbefore of the secondary suspending agent for a vinyl compound.

In what follows, the present invention will be described in more detail with reference to the following examples, which however, are not intended to limit thereto the process for suspension polymerization, suspending stabilizing agent for suspension polymerization and aqueous dispersion according to the present invention. In the examples, "part or parts" and "%" mean "part or parts by weight" and "% by weight", respectively, unless otherwise noted.

SYNTHESIS EXAMPLE 1

Synthesis Example of PVA Polymer Having an Carboxyl Group at an End Thereof

In a reaction vessel were fed 2,800 parts of vinyl acetate (hereinafter abbreviated as "VAc"), 690 parts of methanol and 0.234 part of HOOC-CH$_2$-CH$_2$-SH (hereinafter abbreviated as "3-MPA").

The inner part of the vessel was sufficiently replaced with nitrogen, the temperature outside the vessel was raised to 65° C., and when the internal temperature reached 60° C., 10 parts of methanol containing 1.12 parts of 2,2'-azobisisobutyronitrile was added thereto.

Immediately, 50.82 parts of methanol containing 5.08 parts of 3-MPA was continuously added thereto for 4 hours. The conversion to polymer after 4 hours was 65%. After 4 hours, the vessel was cooled and the residual VAc was ejected with methanol from the system by adding methanol under reduced pressure to give a solution of polyvinyl acetate (hereinafter abbreviated as "PVAc") polymer in methanol having a concentration of 70%. A part of the above methanol solution was separated and was adjusted to a concentration of 50% of PVAc polymer. A solution of NaOH in methanol was added to the adjusted methanol solution so that (NaOH)/(VAc) equals 0.009 mol %, and was hydrolyzed at 40° C. to produce PVA polymer having a degree of hydrolysis, of 40 mol %.

The degree of polymerization of the PVA polymer thus obtained was determined by purifying the PVA polymer after complete hydrolysis, reacetylating it and measuring the intrinsic viscosity ($[\eta]$) of thus obtained PVAc polymer in acetone to calculate the degree of polymerization. The degree of polymerization was 350.

The above PVA polymer was washed under reflux with methyl acetate containing a small amount of water, purified by Soxhlet extraction with methanol for 48 hours, subsequently dissolved in heavy water and subjected to nuclear magnetic resonance (hereinafter abbreviated as "NMR") analysis. By the above analysis, the existence of COONa group at an end of the PVA polymer was recognized, and the polymer was identified as PVA polymer having a carboxyl group: NaOOC—CH$_2$—CH$_2$—S— at one end of a molecule thereof.

Subsequently, gel permeation chromatography (hereinafter abbreviated as "GPC") measurement was carried out for PVAc polymer obtained by acetylating the purified PVA polymer as mention above by the use of an apparatus (HLC-802R, produced by Toyo Soda Mfg. Co., Ltd., column: GMH6X2, solvent: tetrahydrofuran, temperature: 23°±1° C.). The result showed Pw/Pn=2.02.

SYNTHESIS EXAMPLE 2

By the same procedure as in Synthesis Example 1, a vinyl ester was polymerized by using the compound represented by the following formula

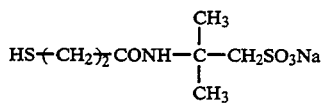

as the chain-transfer agent and the resultant polymer was hydrolyzed to afford a PVA polymer having a sulfonic group at an end thereof and having a degree of polymerization of 2,400 and a degree of hydrolysis of 42 mol %.

The PVA polymer thus obtained was dissolved in D$_6$-DMSO (dimethyl sulfoxide) and subjected to NMR analysis. As the result, the existence of a sulfonic group at an end thereof was confirmed. The NMR spectrum thus obtained is shown in FIG. 1.

SYNTHESIS EXAMPLE 3

By the same procedure as in Synthesis Example 1, a vinyl ester was polymerized by using the compound represented by the following formula

HS—(CH$_2$)$_2$—CONHCH$_2$N$^+$(CH$_3$)$_3$Cl$^-$ as the chain-transfer agent and the resultant polymer was hydrolyzed to afford a PVA polymer having a quaternary ammonium group at an end thereof and having a degree of polymerization of 1,800 and a degree of hydrolysis of 30 mol %.

The PVA polymer thus obtained was dissolved in D$_6$-DMSO and subjected to NMR analysis. As the result, the existence of a quaternary ammonium group at an end thereof was confirmed.

EXAMPLES 1 TO 24

Using a suspending agent comprising a PVA polymer having an amino group, ammonium group, carboxyl group or sulfonic group at an end thereof which was obtained according to the procedures in the aforestated Synthesis Examples 1 to 3, the suspension polymerization of vinyl chloride was carried out by the procedures described hereunder.

In a 50-liter glass-lined autoclave were fed deionized water in an amount calculated so as to attain 40 parts including the amount of water in the aqueous solution of a primary suspending agent and in the aqueous dispersion of a secondary suspending agent, both the agents being separately fed to the autoclave, 2% aqueous solution of the primary suspending agent and 2% aqueous dispersion of the secondary suspending agent, as indicated in Table 1.

Subsequently, 0.009 part of a 50% solution of diisopropyl peroxydicarbonate in toluene was fed in the autoclave, which was then evacuated to a reduced pressure of 50 mm Hg to expel oxygen. Thereafter, 30 parts by weight of vinyl chloride monomer was fed into the autoclave and polymerized at a temperature raised to 57° C. with stirring.

The pressure in the autoclave of 8.5 kG/cm$^2$G at the start of polymerization fell to 4.5 kG/cm$^2$G after 7 hours from the start of polymerization, when the polymerization was stopped. Then, unreacted vinyl chloride monomer was driven off, and the content was taken out of the autoclave, followed by dehydration and drying.

The phyical properties and quantities of the suspending agents used are shown in Table 1. The performance of the vinyl chloride resin thus obtained is indicated in Table 2. The vinyl chloride resin had a polymerization yield of 85% and an average degree of polymerization of 1,050.

COMPARATIVE EXAMPLES 1 TO 5

The procedure of Examples 1 to 24 was repeated to carry out the suspension polymerization of vinyl chloride except that PVA polymer or PVA without an ionic group at an end thereof was used as the suspending agents in place of that having an ionic group at an end thereof.

The physical properties and quantities of the suspending agents used are shown in Table 1. The performance of the vinyl chloride resin thus obtained is indicated in Table 2.

The performance of the vinyl chloride resin obtained in the above-mentioned Examples and Comparative Examples was measured by the following methods, (1) Granulometric distribution Granulometric distribution was measured by dry sieving analysis, using a Tyler standard wire mesh sieve.

(2) Bulk density

Bulk density was measured according to JIS K 6721 (1959).

(3) Uniformity of granules porosity

A mixture of 100 parts of vinyl chloride resin, 50 parts of dioctyl phthalate, 1 part of dibutyltin maleate, 1 part of cetyl alcohol, 0.25 part of titanium dioxide pigment and 0.1 part of carbon black was kneaded with a roll at 150° C. for each prescribed time (3, 5 or 7 minutes) to form 0.2 mm thick sheets. By allowing each sheet to transmit a light, the number of fish-eyes contained per 100 cm$^2$ of each sheet was counted. It points out that the sooner the fish-eyes disappears, the better the uniformity of granules porosity.

(4) Platicizer absorption

Using a planetary mixer connected to a plastograph, 100 parts of vinyl chloride resin and 50 parts of dioctyl phthalate were fed in a vessel maintained at 80° C. with kneading, and the kneading torque was measured after each elapse of time. The plasticizer absorption was expressed by the kneading period of time until the kneading torque went down.

(5) Vinyl chloride monomer residue

A predetermined amount of vinyl chloride resin was dissolved in tetrahydrofuran and the content of vinyl chloride monomer in the vinyl chloride resin was determined by gas chromatography.

TABLE 1

Suspending agent

PVA polymer having an amino group or ammonium group at an end thereof

| No. | Structure of terminal group | Degree of hydrolysis (mol %) | Degree of polymerization | Amount*1 | PVA (C) used in combination Degree of hydrolysis (mol %) | Degree of polymerization | Amount*1 | PVA (D) used in combination Degree of hydrolysis (mol %) | Degree of polymerization | Amount*1 |
|---|---|---|---|---|---|---|---|---|---|---|
| Example 1 | (CH₃)₂N(CH₂)₅S— | 62 | 150 | 0.06 | — | — | — | — | — | — |
| Example 2 | (CH₃)₂N(CH₂)₅S— | 65 | 300 | 0.06 | — | — | — | — | — | — |
| Example 3 | C₄H₄N(CH₂)₅S—*2 | 68 | 500 | 0.06 | — | — | — | — | — | — |
| Example 4 | Cl⁻(CH₃)₃N⁺CH₂NHCO(CH₂)₂S— | 82 | 1800 | 0.06 | — | — | — | — | — | — |
| Example 5 | (CH₃)₂N(CH₂)₂O(CH₂)₅S— | 88 | 700 | 0.06 | — | — | — | — | — | — |
| Example 6 | (CH₃)₂N(CH₂)₅S— | 67 | 150 | 0.06 | 80 | 2000 | 0.02 | — | — | — |
| Example 7 | (CH₃)₂N(CH₂)₅S— | 67 | 150 | 0.06 | 80 | 2000 | 0.01 | 45 | 600 | 0.01 |
| Example 8 | Cl⁻(CH₃)₂N⁺CH₂NHCO(CH₂)₂S— | 82 | 1800 | 0.06 | — | — | — | 35 | 600 | 0.02 |

PVA polymer having a carboxyl group at an end thereof

| No. | Structure of terminal group | Degree of hydrolysis (mol %) | Degree of polymerization | Amount*1 | PVA (C) used in combination Degree of hydrolysis (mol %) | Degree of polymerization | Amount*1 | PVA (D) used in combination Degree of hydrolysis (mol %) | Degree of polymerization | Amount*1 |
|---|---|---|---|---|---|---|---|---|---|---|
| Example 9 | NaOOC(CH₂)₂S— | 61 | 120 | 0.06 | — | — | — | — | — | — |
| Example 10 | COONa  \|  CH₂—(CH₂)₂—CHS—  \|  COONa | 63 | 320 | 0.06 | — | — | — | — | — | — |
| Example 11 | COONa  \|  CH₂—(CH₂)₂—CHS—  \|  COONa | 66 | 500 | 0.06 | — | — | — | — | — | — |
| Example 12 | NaOOC(CH₂)₂S— | 84 | 2000 | 0.06 | — | — | — | — | — | — |
| Example 13 | NaOOC(CH₂)₄S— | 88 | 700 | 0.06 | — | — | — | — | — | — |
| Example 14 | NaOOC(CH₂)₂S— | 61 | 120 | 0.06 | 80 | 2000 | 0.02 | — | — | — |
| Example 15 | NaOOC(CH₂)₄S— | 80 | 100 | 0.07 | 80 | 2000 | 0.01 | 44 | 600 | 0.01 |
| Example 16 | NaOOC(CH₂)₂S— | 84 | 2000 | 0.06 | — | — | — | 30 | 600 | 0.02 |

PVA polymer having a sulfonic group at an end thereof

| No. | Structure of terminal group | Degree of hydrolysis (mol %) | Degree of polymerization | Amount*1 | PVA (C) used in combination Degree of hydrolysis (mol %) | Degree of polymerization | Amount*1 | PVA (D) used in combination Degree of hydrolysis (mol %) | Degree of polymerization | Amount*1 |
|---|---|---|---|---|---|---|---|---|---|---|
| Example 17 | NaO₃S(CH₂)₂NHCO(CH₂)₂S— | 62 | 120 | 0.06 | — | — | — | — | — | — |
| Example 18 | NaO₃S(CH₂)₂NHCO(CH₂)₂S— | 64 | 300 | 0.06 | — | — | — | — | — | — |
| Example 19 | NaO₃S(CH₂)₂NHCO(CH₂)₂S— | 68 | 600 | 0.06 | — | — | — | — | — | — |
| Example 20 | NaO₃S(CH₂)₂NHCO(CH₂)₂S— | 83 | 1850 | 0.06 | — | — | — | — | — | — |
| Example 21 | NaO₃S(CH₂)₂NHCO(CH₂)₂S— | 87 | 1850 | 0.06 | — | — | — | — | — | — |
| Example 22 | NaO₃S(CH₂)₂NHCO(CH₂)₂S— | 62 | 120 | 0.06 | 80 | 2000 | 0.02 | — | — | — |
| Example 23 | NaO₃S(CH₂)₂NHCO(CH₂)₂S— | 62 | 300 | 0.07 | 80 | 2000 | 0.01 | 30 | 600 | 0.01 |
| Example 24 | NaO₃S(CH₂)₂NHCO(CH₂)₂S— | 83 | 1850 | 0.06 | — | — | — | 45 | 600 | 0.02 |

PVA polymer having a terminal group

| No. | Structure of terminal group | Degree of hydrolysis (mol %) | Degree of polymerization | Amount*1 | PVA (C) used in combination Degree of hydrolysis (mol %) | Degree of polymerization | Amount*1 | PVA (D) used in combination Degree of hydrolysis (mol %) | Degree of polymerization | Amount*1 |
|---|---|---|---|---|---|---|---|---|---|---|

TABLE 1-continued

| | | Suspending agent | | | | | |
|---|---|---|---|---|---|---|---|
| Comparative Example 1 | CH₃(CH₂)₁₁S— | 80 | 600 | 0.06 | — | — | — |
| Comparative Example 2 | CH₃(CH₂)₁₁S— | 65 | 150 | 0.04 | 80 | 2000 | 0.04 |
| Comparative Example 3 | — | — | — | — | 80 | 200 | 0.06 |
| Comparative Example 4*³ | Itaconic acid (2 mol %)*⁴ | 78 | 700 | 0.06 | — | — | — |
| Comparative Example 5*³ | Sodium allylsulfonate (2 mol %)*⁴ | 80 | 1500 | 0.06 | — | — | — |

*¹Amount of solid used, based on vinyl chloride monomer (%/vinyl chloride monomer)

*²indicates 

*³PVA polymer having an ionic group at a side chain thereof was used in place of PVA polymer having a terminal group.

*⁴indicates the side-chain group of PVA polymer having an ionic group at a side chain thereof.

TABLE 2

| No. | Granulometric distribution | | | Bulk density (g/cc) | Uniformity of granule porosity (number of fish-eyes) | | | Plasticizer absorption (minute) | Vinyl chloride monomer residue (ppm) |
|---|---|---|---|---|---|---|---|---|---|
| | 42 mesh pass (%) | 100 mesh pass (%) | 250 mesh pass (%) | | 3 min. | 5 min. | 7 min. | | |
| Example 1 | 100 | 55 | 0 | 0.528 | 42 | 0 | 0 | 5.5 | 0.7 |
| Example 2 | 100 | 53 | 0 | 0.535 | 40 | 1 | 0 | 5.5 | 0.7 |
| Example 3 | 100 | 53 | 0 | 0.546 | 40 | 0 | 0 | 5.3 | 0.5 |
| Example 4 | 100 | 54 | 0 | 0.545 | 41 | 0 | 0 | 5.0 | 0.4 |
| Example 5 | 100 | 51 | 0 | 0.538 | 43 | 1 | 0 | 5.7 | 0.7 |
| Example 6 | 100 | 53 | 0 | 0.542 | 41 | 0 | 0 | 5.4 | 0.6 |
| Example 7 | 100 | 54 | 0 | 0.541 | 42 | 0 | 0 | 5.5 | 0.4 |
| Example 8 | 100 | 52 | 0 | 0.548 | 40 | 0 | 0 | 5.2 | 0.5 |
| Example 9 | 100 | 53 | 0 | 0.540 | 37 | 0 | 0 | 5.2 | 0.5 |
| Example 10 | 100 | 53 | 0 | 0.530 | 38 | 1 | 0 | 5.2 | 0.4 |
| Example 11 | 100 | 51 | 0 | 0.549 | 38 | 0 | 0 | 4.5 | 0.3 |
| Example 12 | 100 | 52 | 0 | 0.552 | 37 | 0 | 0 | 4.8 | 0.3 |
| Example 13 | 100 | 55 | 0 | 0.538 | 41 | 1 | 0 | 5.0 | 0.6 |
| Example 14 | 100 | 54 | 0 | 0.545 | 39 | 0 | 0 | 4.8 | 0.2 |
| Example 15 | 100 | 52 | 0 | 0.550 | 40 | 0 | 0 | 4.8 | 0.2 |
| Example 16 | 100 | 51 | 0 | 0.548 | 40 | 1 | 0 | 4.8 | 0.3 |
| Example 17 | 100 | 52 | 0 | 0.538 | 39 | 0 | 0 | 5.3 | 0.5 |
| Example 18 | 100 | 48 | 0 | 0.540 | 39 | 1 | 0 | 5.4 | 0.4 |
| Example 19 | 100 | 49 | 0 | 0.552 | 40 | 0 | 0 | 5.1 | 0.3 |
| Example 20 | 100 | 51 | 0 | 0.549 | 38 | 0 | 0 | 5.1 | 0.4 |
| Example 21 | 100 | 50 | 0 | 0.542 | 41 | 1 | 0 | 5.5 | 0.4 |
| Example 22 | 100 | 53 | 0 | 0.548 | 38 | 0 | 0 | 5.1 | 0.3 |
| Example 23 | 100 | 48 | 0 | 0.546 | 39 | 0 | 0 | 4.9 | 0.3 |
| Example 24 | 100 | 49 | 0 | 0.540 | 40 | 1 | 0 | 4.8 | 0.2 |
| Comparative Example 1 | 100 | 57 | 0 | 0.523 | 55 | 2 | 0 | 10.2 | 1.5 |
| Comparative Example 2 | 100 | 40 | 0 | 0.519 | 50 | 1 | 0 | 8.5 | 1.5 |
| Comparative Example 3 | 100 | 38 | 0 | 0.492 | 700 | 50 | 13 | 15.0 | 150 |
| Comparative Example 4 | 100 | 35 | 0 | 0.486 | 58 | 3 | 0 | 12.0 | 8.6 |
| Comparative Example 5 | blocks were yielded | | | | | | | | |

EXAMPLES 25 TO 50 AND COMPARATIVE EXAMPLES 6 TO 9

The procedure of Examples 1 to 24 was repeated to carry out the suspension polymerization of vinyl chloride except that 5% aqueous dispersion containing as the secondary suspending agent the dispersoid of PVAc polymer or PVA polymer each having an ionic group at an end thereof was used.

The physical properties and quantities of the suspending agents used are shown in Table 3. The performance of the vinyl chloride resin thus obtained is indicated in Table 4.

EXAMPLE 51

The procedure of Example 33 was repeated except that 5% aqueous solution of the primary suspending agent and 5% aqueous dispersion of the secondary suspending agent were mixed together and thereafter fed in the polymerization vessel.

The physical properties and quantities of the suspending agents used are shown in Table 3. The performance of the vinyl chloride resin thus obtained is indicated in Table 4.

EXAMPLE 52

The procedure of Example 33 was repeated except that the primary suspending agent was fed as 5% aqueous solution, and that the secondary suspending agent was fed as powder as such.

The physical properties and quanties of the suspending agents used are shown in Table 3. The performance of the vinyl chloride resin thus obtained is indicated in Table 4.

TABLE 3

| | Suspending agent | | | | | | |
|---|---|---|---|---|---|---|---|
| | PVAc polymer or PVA polymer having a sulfonic group at an end thereof | | | | PVA | | |
| No. | Structure of terminal group | Degree of hydrolysis (mol %) | Degree of polymerization | Amount[*1] | Degree of hydrolysis (mol %) | Degree of polymerization | Amount[*1] |
| Example 25 | $NaO_3S(CH_2)_2NHCO(CH_2)_2S-$ | 0 | 120 | 0.01 | 62 | 1700 | 0.06 |
| Example 26 | $NaO_3S(CH_2)_2NHCO(CH_2)_2S-$ | 28 | 300 | 0.01 | 88 | 1700 | 0.06 |
| Example 27 | $NaO_3S(CH_2)_2NHCO(CH_2)_2S-$ | 36 | 300 | 0.01 | 70 | 700 | 0.06 |
| Example 28 | $NaO_3S(CH_2)_2NHCO(CH_2)_2S-$ | 43 | 550 | 0.03 | 70 | 700 | 0.03 |
| Example 29 | $NaO_3S(CH_2)_2NHCO(CH_2)_2S-$ | 48 | 550 | 0.06 | 78 | 2000 | 0.03 |
| Example 30 | $NaO_3SCH_2C(CH_3)_2NHCO(CH_2)_2S-$ | 25 | 1800 | 0.01 | 88 | 1700 | 0.06 |
| Example 31 | $NaO_3SCH_2C(CH_3)_2NHCO(CH_2)_2S-$ | 51 | 700 | 0.03 | 72 | 700 | 0.06 |
| Example 32 | $NaO_3SCH_2C(CH_3)_2NHCO(CH_2)_2S-$ | 59 | 2600 | 0.01 | 85 | 2000 | 0.06 |
| | PVAc polymer or PVA polymer having a carboxyl group at an end thereof | | | | PVA | | |
| | | Degree of hydrolysis | Degree of polymeri- | | Degree of hydrolysis | Degree of polymeri- | |

TABLE 3-continued

| | Suspending agent | | | | | | |
|---|---|---|---|---|---|---|---|
| No. | Structure of terminal group | (mol %) | zation | Amount*1 | (mol %) | zation | Amount*1 |
| Example 33 | NaOOC(CH2)2S— | 38 | 150 | 0.01 | 80 | 2000 | 0.06 |
| Example 34 | NaOOC(CH2)2S— | 42 | 300 | 0.01 | 62 | 600 | 0.06 |
| Example 35 | NaOOC(CH2)2S— | 48 | 500 | 0.01 | 90 | 1000 | 0.06 |
| Example 36 | COONa  COONa<br>\|      \|<br>CH2—(CH2)2—CHS— | 20 | 420 | 0.03 | 72 | 700 | 0.03 |
| Example 37 | COONa  COONa<br>\|      \|<br>CH2—(CH2)2—CHS— | 0 | 420 | 0.06 | 88 | 1700 | 0.03 |
| Example 38 | NaOOC(CH2)2S— | 57 | 1800 | 0.02 | 72 | 700 | 0.06 |
| Example 39 | NaOOC(CH2)2S— | 30 | 2700 | 0.01 | 80 | 700 | 0.06 |
| Example 40 | NaOOC(CH2)2S— | 26 | 700 | 0.01 | 80 | 2000 | 0.06 |

| | PVAc polymer or PVA polymer having an amino group or ammonium group at an end thereof | | | | PVA | | |
|---|---|---|---|---|---|---|---|
| No. | Structure of terminal group | Degree of hydrolysis (mol %) | Degree of polymerization | Amount*1 | Degree of hydrolysis (mol %) | Degree of polymerization | Amount*1 |
| Example 41 | NH2(CH2)5S— | 0 | 350 | 0.01 | 90 | 800 | 0.06 |
| Example 42 | NH2(CH2)5S— | 22 | 350 | 0.01 | 80 | 2400 | 0.06 |
| Example 43 | NH2(CH2)5S— | 38 | 350 | 0.01 | 88 | 1200 | 0.06 |
| Example 44 | NH2(CH2)5S— | 48 | 350 | 0.01 | 70 | 1500 | 0.06 |
| Example 45 | NH2(CH2)5S— | 58 | 350 | 0.01 | 67 | 1700 | 0.06 |
| Example 46 | NH2CH2O(CH2)5S— | 44 | 200 | 0.01 | 80 | 600 | 0.06 |
| Example 47 | NH2CH2O(CH2)5S— | 40 | 120 | 0.01 | 78 | 1000 | 0.06 |
| Example 48 | Cl−H3N+CH2NHCO(CH2)2S— | 12 | 120 | 0.01 | 75 | 1500 | 0.06 |
| Example 49 | NH2(CH2)5S— | 44 | 350 | 0.04 | 77 | 1900 | 0.04 |
| Example 50 | C4H4N(CH2)2S—*2 | 35 | 1700 | 0.06 | 77 | 1900 | 0.03 |
| Example 51*3 | NaOOC(CH2)2S— | 35 | 520 | 0.01 | 80 | 2000 | 0.06 |
| Example 52*3 | NaOOC(CH2)2S— | 35 | 520 | 0.01 | 80 | 2000 | 0.06 |

| | PVAc polymer having an ionic group at a side chain thereof | | | | PVA | | |
|---|---|---|---|---|---|---|---|
| No. | Structure of side-chain group | Degree of hydrolysis (mol %) | Degree of polymerization | Amount*1 | Degree of hydrolysis (mol %) | Degree of polymerization | Amount*1 |
| Copmparative Example 6 | Itaconic acid (1 mol %) | 40 | 1050 | 0.01 | 82 | 1700 | 0.06 |
| Copmparative Example 7 | Methacrylamide-propyltrimethyl ammonium chloride (1 mol %) | 38 | 850 | 0.01 | 65 | 500 | 0.06 |
| Copmparative Example 8 | Sodium allylsulfonate (1 mol %) | 35 | 700 | 0.01 | 75 | 2000 | 0.06 |
| Copmparative Example 9 | Unmodified | 43 | 500 | 0.01 | 72 | 700 | 0.06 |

*1Amount of solid used, based on vinyl chloride monomer (%/vinyl chloride monomer)

*2indicates 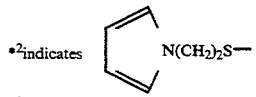

*3PVAc polymer or PVA polymer having an carboxyl group at an end thereof was used.

TABLE 4

| | Granulometric distribution | | | Bulk density | Uniformity of granule porosity (number of fish-eyes) | | | Plasticizer absorption | Vinyl chloride monomer residue |
|---|---|---|---|---|---|---|---|---|---|
| No. | 42 mesh pass (%) | 100 mesh pass (%) | 250 mesh pass (%) | (g/cc) | 3 min. | 5 min. | 7 min. | (minute) | (ppm) |
| Example 25 | 100 | 50 | 0 | 0.542 | 39 | 0 | 0 | 4.9 | 0.4 |
| Example 26 | 100 | 51 | 0 | 0.546 | 39 | 0 | 0 | 4.8 | 0.4 |
| Example 27 | 100 | 48 | 0 | 0.552 | 38 | 0 | 0 | 4.7 | 0.3 |
| Example 28 | 100 | 49 | 0 | 0.551 | 37 | 0 | 0 | 4.7 | 0.3 |
| Example 29 | 100 | 50 | 0 | 0.539 | 41 | 1 | 0 | 5.1 | 0.6 |
| Example 30 | 100 | 50 | 0 | 0.550 | 38 | 0 | 0 | 4.7 | 0.3 |
| Example 31 | 100 | 49 | 0 | 0.543 | 40 | 0 | 0 | 4.9 | 0.5 |
| Example 32 | 100 | 48 | 0 | 0.540 | 41 | 1 | 0 | 4.8 | 0.6 |
| Example 33 | 100 | 50 | 0 | 0.561 | 38 | 0 | 0 | 4.7 | 0.2 |
| Example 34 | 100 | 51 | 0 | 0.559 | 37 | 0 | 0 | 4.7 | 0.1 |
| Example 35 | 100 | 48 | 0 | 0.555 | 40 | 0 | 0 | 5.0 | 0.3 |
| Example 36 | 100 | 49 | 0 | 0.554 | 39 | 0 | 0 | 5.1 | 0.3 |
| Example 37 | 100 | 48 | 0 | 0.550 | 41 | 1 | 0 | 5.1 | 0.5 |
| Example 38 | 100 | 50 | 0 | 0.552 | 40 | 1 | 0 | 5.0 | 0.4 |
| Example 39 | 100 | 48 | 0 | 0.555 | 37 | 0 | 0 | 4.9 | 0.3 |
| Example 40 | 100 | 48 | 0 | 0.558 | 37 | 0 | 0 | 4.7 | 0.2 |
| Example 41 | 100 | 48 | 0 | 0.540 | 42 | 1 | 0 | 6.3 | 0.5 |

TABLE 4-continued

| No. | Granulometric distribution | | | Bulk density (g/cc) | Uniformity of granule porosity (number of fish-eyes) | | | Plasticizer absorption (minute) | Vinyl chloride monomer residue (ppm) |
| --- | --- | --- | --- | --- | --- | --- | --- | --- | --- |
| | 42 mesh pass (%) | 100 mesh pass (%) | 250 mesh pass (%) | | 3 min. | 5 min. | 7 min. | | |
| Example 42 | 100 | 49 | 0 | 0.550 | 40 | 0 | 0 | 5.8 | 0.3 |
| Example 43 | 100 | 51 | 0 | 0.553 | 38 | 0 | 0 | 5.5 | 0.3 |
| Example 44 | 100 | 48 | 0 | 0.552 | 37 | 0 | 0 | 5.7 | 0.3 |
| Example 45 | 100 | 52 | 0 | 0.547 | 41 | 0 | 0 | 5.9 | 0.4 |
| Example 46 | 100 | 50 | 0 | 0.549 | 39 | 0 | 0 | 5.8 | 0.4 |
| Example 47 | 100 | 48 | 0 | 0.543 | 42 | 0 | 0 | 6.0 | 0.6 |
| Example 48 | 100 | 48 | 0 | 0.542 | 42 | 1 | 0 | 6.1 | 0.5 |
| Example 49 | 100 | 50 | 0 | 0.548 | 40 | 0 | 0 | 5.9 | 0.4 |
| Example 50 | 100 | 51 | 0 | 0.544 | 41 | 1 | 0 | 6.3 | 0.6 |
| Example 51 | 100 | 50 | 0 | 0.550 | 42 | 1 | 0 | 6.0 | 0.7 |
| Example 52 | 100 | 50 | 0 | 0.545 | 42 | 1 | 0 | 6.3 | 0.9 |
| Comparative Example 6 | 100 | 47 | 0 | 0.480 | 51 | 2 | 0 | 7.0 | 1.0 |
| Comparative Example 7 | 100 | 50 | 0 | 0.492 | 57 | 2 | 0 | 6.9 | 3.5 |
| Comparative Example 8 | | | | blocks were yielded | | | | | |
| Comparative Example 9 | 100 | 50 | 0 | 0.529 | 50 | 1 | 0 | 6.5 | 3.0 |

EXAMPLES 53 TO 58 AND COMPARATIVE EXAMPLES 10, 11

A PVES polymer or PVA polymer as shown in Table 5 was poured into water and agitated with an impeller at room temperature for 1 hour to produce an aqueous dispersion containing the dispersoid of the PVES polymer or PVA polymer. Subsequently, the aqueous dispersion thus obtained was observed for the properties thereof with the results shown in Table 5.

TABLE 5

| No. | PVAc polymer or PVA polymer having an ionic group at an end thereof | | | Aqueous dispersion | | |
| --- | --- | --- | --- | --- | --- | --- |
| | Structure of terminal group | Degree of hydrolysis (mol %) | Degree of polymerization | Concentration of aqueous dispersion (%) | Dispersion state*2 | Stability after left as such*5 |
| Example 53 | ClNH$_3$(CH$_2$)$_5$S— | 15 | 300 | 0.5 | Good*3 | Unchanged |
| Example 54 | ClNH$_3$CH$_2$NHCO(CH$_2$)$_2$S— | 48 | 2200 | 1.5 | Good*3 | Unchanged |
| Example 55 | NaOOC(CH$_2$)$_2$S— | 68 | 1800 | 5 | Good*3 | Unchanged |
| Example 56 | COONa    COONa<br>  \|         \|<br>CH$_2$—(CH$_2$)$_2$—CHS— | 35 | 700 | 32 | Good*4 | Unchanged |
| Example 57 | NaO$_3$S(CH$_2$)$_3$S— | 0 | 52 | 50 | Good*4 | Unchanged |
| Example 58 | NaO$_3$SCH$_2$C(CH$_3$)$_2$NHCOC(CH$_2$)$_2$S— | 22 | 150 | 68 | Good*4 | Unchanged |
| Comparative Example 10 | Unmodified | 45 | 500 | 1 | Undispersed | — |
| Comparative Example 11 | Unmodified*1 | 40 | 500 | 2 | Whitened | *6 |

*1Unmodified PVA having a degree of hydrolysis of 75 mol % and a degree polymerization of 1500 was added in the same amount as the unmodified PVA of dispersoid
*2Judged by visual observation
*3Milky white: with low viscosity and small particle diameter
*4Pasty: dispersed at high viscosity
*5Left as such at 40° C. for 30 days and change of appearance was visually observed
*6Settled immediately after stoppage of stirring

INDUSTRIAL APPLICABILITY

According to the process for suspension polymerization of a vinyl compound in accordance with the present invention which uses as the suspending agent a PVES polymer having an ionic group at an end thereof or a PVA polymer having an ionic group at an end thereof and a degree of hydrolysis of 90 mol % or less, vinyl polymer granules having a sharp granulometric distribution, high bulk density, high plasticizer absorption and low vinyl monomer residue are obtained.

In particular, according to the process for suspension polymerization of a vinyl compound which uses as the secondary suspending agent a PVES polymer having an ionic group at an end thereof or a PVA polymer having a degree of hydrolysis of 60 mol % or less, vinyl polymer granules having markedly excellent processing characteristics such as plasticizer absorption mentioned above are obtained.

In addition, an aqueous dispersion of the present invention which comprises as the dispersoid a PVES polymer having an ionic group at an end thereof or a PVA polymer having a degree of hydrolysis of 60 mol % or less has a favorable long-term storage stability and is excellent as a secondary suspending agent for suspension polymerization of a vinyl compound by virtue of its inherent self emulsifiable property.

Furthermore, a PVA polymer having an ionic group at an end thereof and a degree of hydrolysis of 10 to 60 mol % according to the present invention is useful as the dispersoid in an aqueous dispersion due to its inherent self emulsifiable property and capable of producing vinyl polymer granules having an exceptionally high processing characteristics when used as the secondary suspending agent for suspension polymerization of a vinyl compound.

We claim:

1. A process for suspension polymerization of vinyl chloride which comprises using as the secondary suspending agent a self-emulsifiable vinyl ester polymer having an ionic group at an end thereof or a self-emulsifiable vinyl alcohol polymer having a degree of hydrolysis of 60 mol % or less which is obtained by hydrolysis of said vinyl ester polymer, said ionic group being selected from the group consisting of amino group, ammonium group, carboxyl group and sulfonic group.

2. The process for suspension polymerization of vinyl chloride according to claim 1, wherein said secondary suspending agent is a self-emulsifiable vinyl alcohol polymer having a degree of hydrolysis of 10 to 60 mol % and a degree of polymerization of 50 to 3,000.

3. The process for suspension polymerization of vinyl chloride according to claim 1, wherein said secondary suspending agent is an aqueous dispersion containing as the dispersoid a self-emulsifiable vinyl ester polymer having an ionic group at an end thereof or a self-emulsifiable vinyl alcohol polymer having a degree of hydrolysis of 60 mol % or less which is obtained by hydrolysis of said vinyl ester polymer, said ionic group being selected from the group consisting of amino group, ammonium group, carboxyl group and sulfonic group.

4. A process for suspension polymerization of vinyl chloride which comprises using a suspending agent containing the secondary suspending agent as set forth in any one of claims 1 to 3 in a proportion by solid weight of 10 to 70%.

5. The process for suspension polymerization of vinyl chloride according to claim 4, wherein (A) the secondary suspending agent as set forth in claim 4 and (B) a polyvinyl alcohol having a degree of hydrolysis of 62 to 90 mol % and a degree of polymerization of 300 to 3,000 are used in combination in a (A)/(B) ratio by solid weight of 1/9 to 7/3.

6. A secondary suspending agent for suspension polymerization of vinyl chloride which comprises a self-emulsifiable vinyl ester polymer having an ionic group at an end thereof or a self-emulsifiable vinyl alcohol polymer having a degree of hydrolysis of 60 mol % or less which is obtained by hydrolysis of said vinyl ester polymer, said ionic group being selected from the group consisting of amino group, ammonium group, carboxyl group and sulfonic group.

7. A secondary suspending agent for suspension polymerization of vinyl chloride which comprises an aqueous dispersion containing as the dispersoid a self-emulsifiable vinyl ester polymer having an ionic group at an end thereof or a self-emulsifiable vinyl alcohol polymer having a degree of hydrolysis of 60 mol % or less which is obtained by hydrolysis of said vinyl ester polymer, said ionic group being selected from the group consisting of amino group, ammonium group, carboxyl group and sulfonic group.

8. An aqueous dispersion which comprises water as the dispersion-medium and as the dispersoid a self-emulsifiable vinyl ester polymer having an ionic group at an end thereof or a self-emulsifiable vinyl alcohol polymer having a degree of hydrolysis of 60 mol % or less which is obtained by hydrolysis of said vinyl ester polymer, said ionic group being selected from the group consisting of amino group, ammonium group, carboxyl group and sulfonic group.

9. A self-emulsifiable vinyl alcohol polymer having a carboxylic group at an end thereof, a degree of hydrolysis of 10 to 60 mol % and a degree of polymerization of 50 to 3,000.

* * * * *